(12) United States Patent
Crow et al.

(10) Patent No.: US 11,058,059 B2
(45) Date of Patent: Jul. 13, 2021

(54) DECK PLATE EXTENSION WITH A KERNEL CHANNEL FOR A ROW UNIT OF AN AGRICULTURAL HARVESTER

(71) Applicant: CNH Industrial America LLC, New Holland, PA (US)

(72) Inventors: Brian P. Crow, Rock Island, IL (US); Jonathan E. Ricketts, Coal Valley, IL (US); Dan L. Garland, Solon, IA (US)

(73) Assignee: CNH Industrial America LLC, New Holland, PA (US)

( * ) Notice: Subject to any disclaimer, the term of this patent is extended or adjusted under 35 U.S.C. 154(b) by 281 days.

(21) Appl. No.: 16/211,981

(22) Filed: Dec. 6, 2018

(65) Prior Publication Data

US 2020/0178465 A1 Jun. 11, 2020

(51) Int. Cl.
*A01D 45/02* (2006.01)
*A01D 57/22* (2006.01)

(52) U.S. Cl.
CPC ........... *A01D 45/023* (2013.01); *A01D 57/22* (2013.01)

(58) Field of Classification Search
CPC .. A01D 45/021; A01D 45/023; A01D 45/025; A01D 41/12; A01D 43/082; A01D 45/02; A01D 57/22; A01D 43/083
See application file for complete search history.

(56) References Cited

U.S. PATENT DOCUMENTS

| | | | |
|---|---|---|---|
| 2,604,749 A | 7/1952 | Fergason | |
| 3,101,579 A | 8/1963 | Karlsson et al. | |
| 3,517,490 A | 6/1970 | Mathews | |
| 3,759,021 A | 9/1973 | Schreiner et al. | |
| 4,238,916 A * | 12/1980 | Kesl | A01D 43/082 56/104 |
| 4,433,531 A * | 2/1984 | Kesl | A01D 43/082 56/106 |
| 5,704,202 A * | 1/1998 | Calmer | A01D 45/023 56/106 |
| 5,878,561 A * | 3/1999 | Gunn | A01D 45/023 56/119 |
| 5,881,541 A | 3/1999 | Silver et al. | |

(Continued)

FOREIGN PATENT DOCUMENTS

| | | |
|---|---|---|
| EP | 3014973 A1 | 5/2016 |
| WO | 2017200872 A1 | 11/2017 |

OTHER PUBLICATIONS

Partial International Search Report and Written Opinion for PCT application PCT/US2019/065000, dated Mar. 16, 2020 (10 pages).

*Primary Examiner* — Arpad Fabian-Kovacs
(74) *Attorney, Agent, or Firm* — Peter Zacharias; Patrick Sheldrake (57) ABSTRACT

A deck plate extension for a row unit of an agricultural harvester. The deck plate extension configured to attach to the return side of the row unit side thereby preventing a kernel crop from dropping to the ground during harvesting. The deck plate extension is further provided with a kernel channel configured to direct the kernel crop along the return side of the row unit side to the harvest side of the row unit side. The deck plate extension may be provided as part of a deck plate of a row unit side or may be provided as a second plate added to the row unit side. The deck plate extension is configured to be added as original equipment and as a retrofit to existing row units.

17 Claims, 6 Drawing Sheets

(56) References Cited

U.S. PATENT DOCUMENTS

| | | | |
|---|---|---|---|
| 6,226,969 B1* | 5/2001 | Becker | A01D 45/021 |
| | | | 56/62 |
| 6,237,312 B1* | 5/2001 | Becker | A01D 45/021 |
| | | | 56/119 |
| 8,863,487 B2 | 10/2014 | Calmer | |
| 9,179,602 B2* | 11/2015 | Vandeven | A01D 45/021 |
| 9,668,413 B2* | 6/2017 | Walker | A01D 45/021 |
| 9,820,438 B2* | 11/2017 | Barry | A01D 45/021 |
| 9,867,335 B1* | 1/2018 | Obbink | A01D 45/021 |
| 9,961,830 B2 | 5/2018 | Gengerke | |
| 2010/0071336 A1* | 3/2010 | Christensen | A01D 45/023 |
| | | | 56/98 |
| 2011/0146217 A1* | 6/2011 | Carboni | A01D 45/021 |
| | | | 56/60 |
| 2011/0173942 A1* | 7/2011 | Kowalchuk | A01D 45/021 |
| | | | 56/62 |
| 2014/0053524 A1* | 2/2014 | Werning | A01D 41/1273 |
| | | | 56/62 |
| 2014/0150394 A1* | 6/2014 | Calmer | A01D 45/021 |
| | | | 56/106 |
| 2016/0174461 A1 | 6/2016 | Walker et al. | |
| 2017/0164555 A1* | 6/2017 | Gengerke | A01D 45/025 |

* cited by examiner

DECK PLATE EXTENSION WITH A KERNEL CHANNEL FOR A ROW UNIT OF AN AGRICULTURAL HARVESTER

BACKGROUND OF THE INVENTION

1. Field of the Invention

The present invention pertains to an agricultural vehicle and, more specifically, to a row unit for an agricultural harvester.

2. Background of the Invention

A corn header of an agricultural harvester in the form of a combine is provided with row dividers for directing rows of corn stalks to downstream separation devices known as row units. The row units include stalk receiving slots and stripping plates, snapping rolls, and opposed rearwardly moving gathering chains. Thus, e.g., following separation of ears from stalks by the snapping rolls and stripping plates (also known as stalk rolls and deck plates, respectively), the separated ears are delivered by the gathering chains to a conveying device, e.g., auger or draper belt, which conveys the harvested ears to a feeder housing of the combine. Harvested ears are then conveyed to the combine's inner sub-systems for downstream processing.

Row unit frames are typically constructed with forwardly projecting members that support several components of the row unit including the deck plates, the stalk roll support bearings, the front gathering chain idlers, the hoods and the row dividers. The deck plates are flat or planar with their shape being dictated by the geometry of the row unit frames. As is known, the stalk rolls are disposed beneath the deck plates and are cooperatively rotated to pull the corn stalks downwardly into the stalk receiving slots where the ears come into contact with the deck plates and are snapped off of the stalks by the deck plates. The deck plates lie generally tangent to the upper surfaces of the stalk rolls and the stalk rolls engage the corn stalks at "pinch points" situated below the upper surfaces of deck plates.

The deck plates are generally provided in pairs defining a gap therebetween, allowing the corn stalks to enter the gap before being pulled down to the deck plates so the corn ear snaps off the stalk. Many headers are equipped with flaps, known as "ear savers," that are mounted to a rear of the row dividers to prevent collected ears from being lost after snapping off the stalk. While ear savers are generally effective to reduce crop loss during harvesting, crop loss still does occur for various reasons.

What is needed in the art is a row unit of an agricultural harvester that can reduce crop loss during harvesting.

SUMMARY OF THE INVENTION

In one exemplary embodiment formed in accordance with the present disclosure, there is provided a row unit side for a row unit of an agricultural harvester. The row unit side includes a row unit support having a leading end and a trailing end relative to a direction of travel. An idler sprocket rotatably attaches to the row unit support near the lead end. A drive sprocket rotatably attaches to the row unit support near the trailing end. A gather chain includes a plurality of gather chain lugs. The idler sprocket and the drive sprocket are enmeshed with the gather chain. A deck plate includes a plate having a harvest side, a return side, a first end and a second end. The plate attaches to the row unit support and includes an idler notch being formed by the plate near the second end and forms a gap with the idler sprocket. A kernel channel is formed on at least a portion of the return side of the plate.

In another exemplary embodiment formed in accordance with the present disclosure, there is provided a deck plate extension for a row unit side of a row unit for an agricultural harvester. The row unit side includes a deck plate edge and an idler sprocket. The deck plate extension includes a plate having a first end, a second end, a first edge and a second edge. The plate has a length from the first end to the second end and a width traverse to the length. The plate is configured to attach near a deck plate edge of the row unit side. An idler notch is formed in the plate near the second end and forms a gap with the idler sprocket. A kernel channel is formed on at least a portion of the second edge of the plate. The kernel channel configured to guide a kernel from the plate to a deck plate of the row unit.

In yet another exemplary embodiment, there is shown a method for reducing kernel loss from a row unit return side on an agricultural harvester.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION OF THE INVENTION

Figure 1:
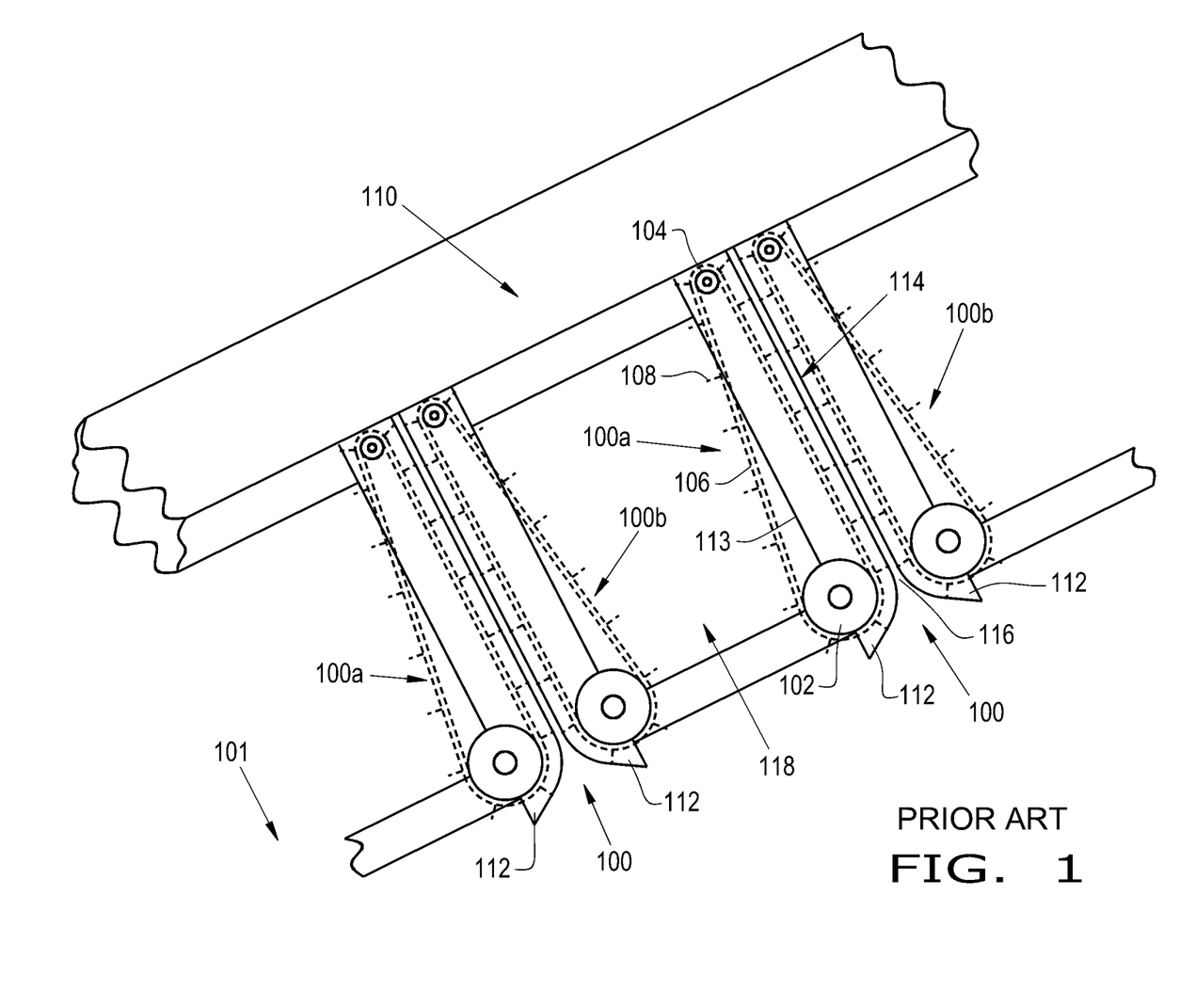
FIG. 1 is a perspective view of a row unit known in the art.

Referring now to the drawings, are more particularly to FIG. 1 there is shown a row unit 100 as is known in the art. Row unit 100 is generally orientated to operate in a direction of travel 101. The row unit 100 has a first side 100a and a second side 100b. The row unit sides 100a, 100b each have an idler sprocket 102 and a drive sprocket 104. The idler sprocket 102 and drive sprocket 104 are enmeshed together via a gather chain 106. The gather chain 106 includes a plurality of gather chain lugs 108. The plurality of gather chain lugs 108 are configured to collect a kernel crop, e.g., corn, and direct the kernel crop to a conveying device 110, e.g., auger or draper belt, disposed at one end of the row unit 100. A harvest side plate 112 is included with each row unit side 100a, 100b and functions to prevent the kernel crop, e.g., corn, from falling to a ground surface as the gather chain lugs 108 direct the kernel crop to the conveying device 110, e.g., auger or draper belt. Each harvest side plate 112 has a harvest plate first edge 113 and a harvest plate second edge 114. The harvest plate second edge 113 of each row unit side 100a, 100b form a harvesting channel 116 therebetween where the rows of crop, e.g., corn, are directed through while the harvested crop, e.g., ears of corn and/or kernel crop, travel along a top surface of the harvest side plate 112 to the conveying device 110. A gap 118 is formed between the harvest plate first edge 113 of a row unit side 100*a* and a row unit side 100*b* of an adjacent row unit 100. The gap 118 is open to the ground and allows any harvested crop not on the harvest side plate 112 to fall to the ground. The harvested crop falling on the ground represents lost revenues.

Figure 2:
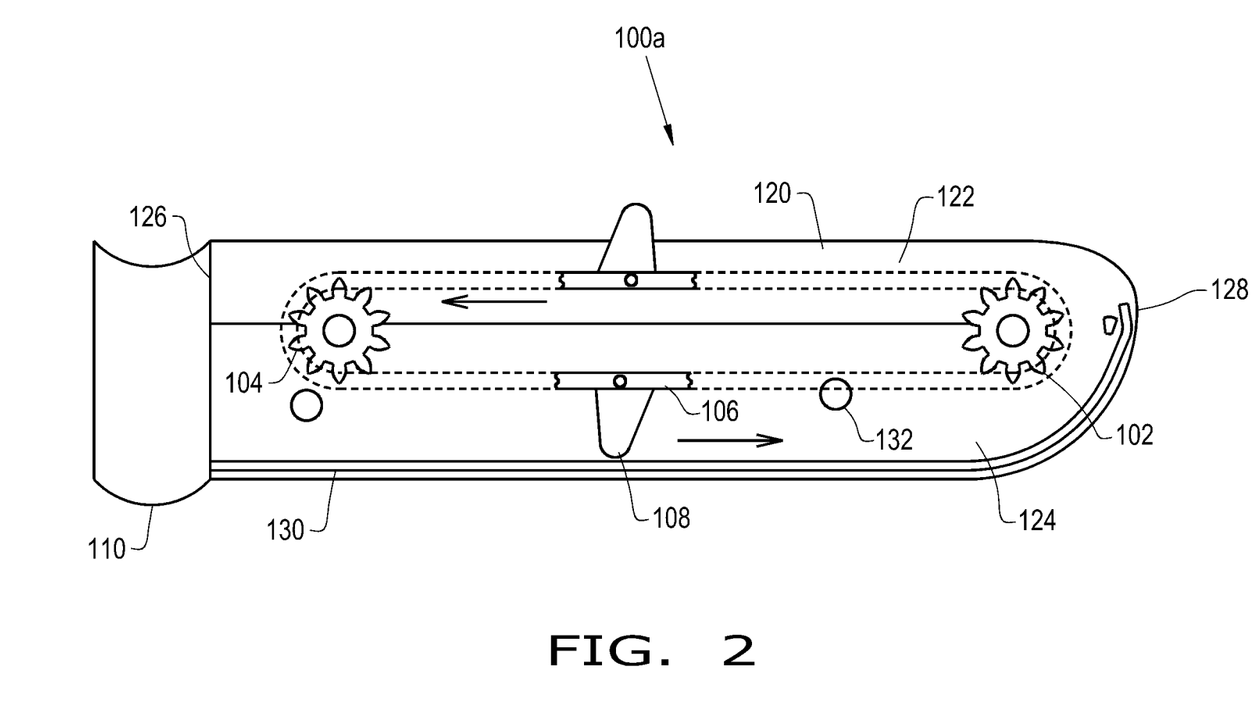
FIG. 2 is a perspective view of an embodiment of a row unit side.

Referring now to the drawings, and more particularly to FIG. 2 there is shown a row unit side 100*a* of the present invention for use in row unit 100. It is to be understood that row unit side 100*a* and row unit side 100*b*, shown in FIG. 1, together form the row unit 100 where row unit side 100*b* is symmetrical to row unit 100*a* about the harvesting channel 116. The row unit side 100*a* includes an idler sprocket 102 and a drive sprocket 104. The idler sprocket 102 and drive sprocket 104 are enmeshed together via a gather chain 106. The gather chain 106 includes a plurality of gather chain lugs 108. The plurality of gather chain lugs 108 are configured to collect a kernel crop, e.g., corn, and direct the kernel crop to a conveying device 110, e.g., auger or draper belt, disposed at one end of the row unit side 100*a*. The row unit side 100*a* further includes a deck plate 120 with a harvest side 122 and a return side 124. The return side 124 covers a portion of the gap 118 thereby providing a surface to prevent the harvested crop from falling to the ground. The return side 124 of the present row unit side 100*a* may be in contact or sufficiently close to contact with a return side 124 of a row unit side 100*b* of an adjacent row unit 100 thereby providing that the gap 118 is completely covered or sufficiently covered. The deck plate 120 may be a single plate or of multiple plates. The deck plate 120 has a first end 126 and a second end 128 where the first end 126 is disposed at the end of the row unit 100 closest to the conveying device 110. A kernel channel 130 is disposed on an edge of the return side of the deck plate 120. The kernel channel 130 may be formed integral to or attached to the deck plate 120. Examples of being formed integral include but are not limited to: a stamping with a rolled edge, a forging with a raised edge, a casting with a raised edge or a machined surface with a raised edge. Methods of attachment include but are not limited to, welding, the use of fasteners or press fit. The kernel channel 130 may be formed of the same or different material of the deck plate 120. A plurality of attachment holes 132 through the deck plate 120 may be used to attach the deck plate 120 to the row unit 100 with fasteners (not shown). The deck plate 120 may be permanently attached to the row unit 100 via a method such as welding.

Figure 5:
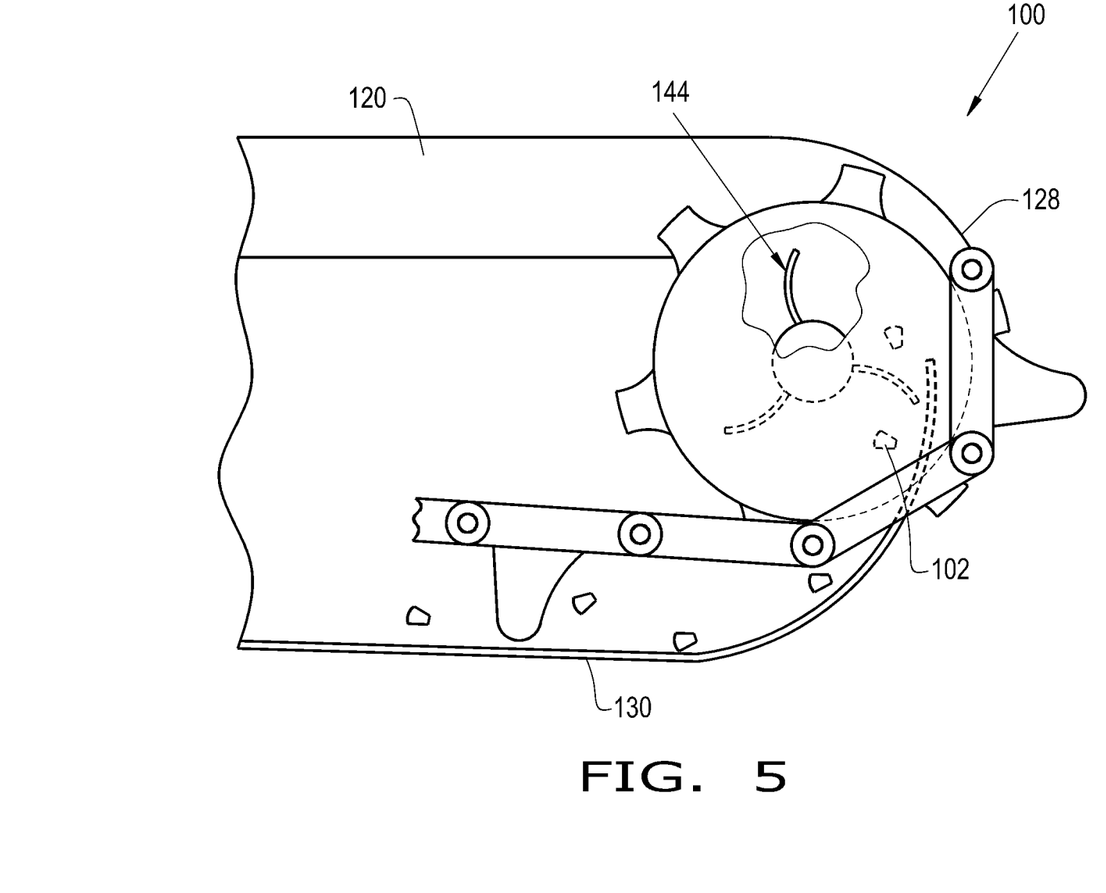
FIG. 5 is a partial top of view of the embodiment shown in FIG. 2.

The row unit side 100*a* may be configured to operate in a way that a rotation of the drive sprocket 104 causes the gather chain 106 and gather chain lugs 108 to move around the deck plate 120 from the second end 128 to the first end 126 along the harvest side 122. Movement of the gather chain lugs 108 moves most of the kernel crop along the harvest side 122 until it reaches the conveying device 110. Kernel crop may also land on the return side 124 of the deck plate 120. Any kernel crop on the return side 124 of the deck plate 120 is forced to move from the first end 126 towards the second end 128 by the gather chain lugs 108. The kernel channel 130 prevents the kernel crop from falling off of the edge of the deck plate 120 and directs the kernel crop to collect at the second end 128 of the deck plate 120. Additional kernel crop being moved by the gather chain lugs 108 on the return side 124 of the deck plate 120 may force the kernel crop already collected at the second end 128 of the deck plate 120 to move from the return side 124 to the harvest side 122. The idler sprocket 102 may be provided with a plurality of idler sprocket propellers 144 (FIG. 5). The idler sprocket propellers 144 are configured to move the kernel crop from the return side 124 to the harvest side 122 with or without additional kernel crop being moved along the return side 124.

Figure 3:
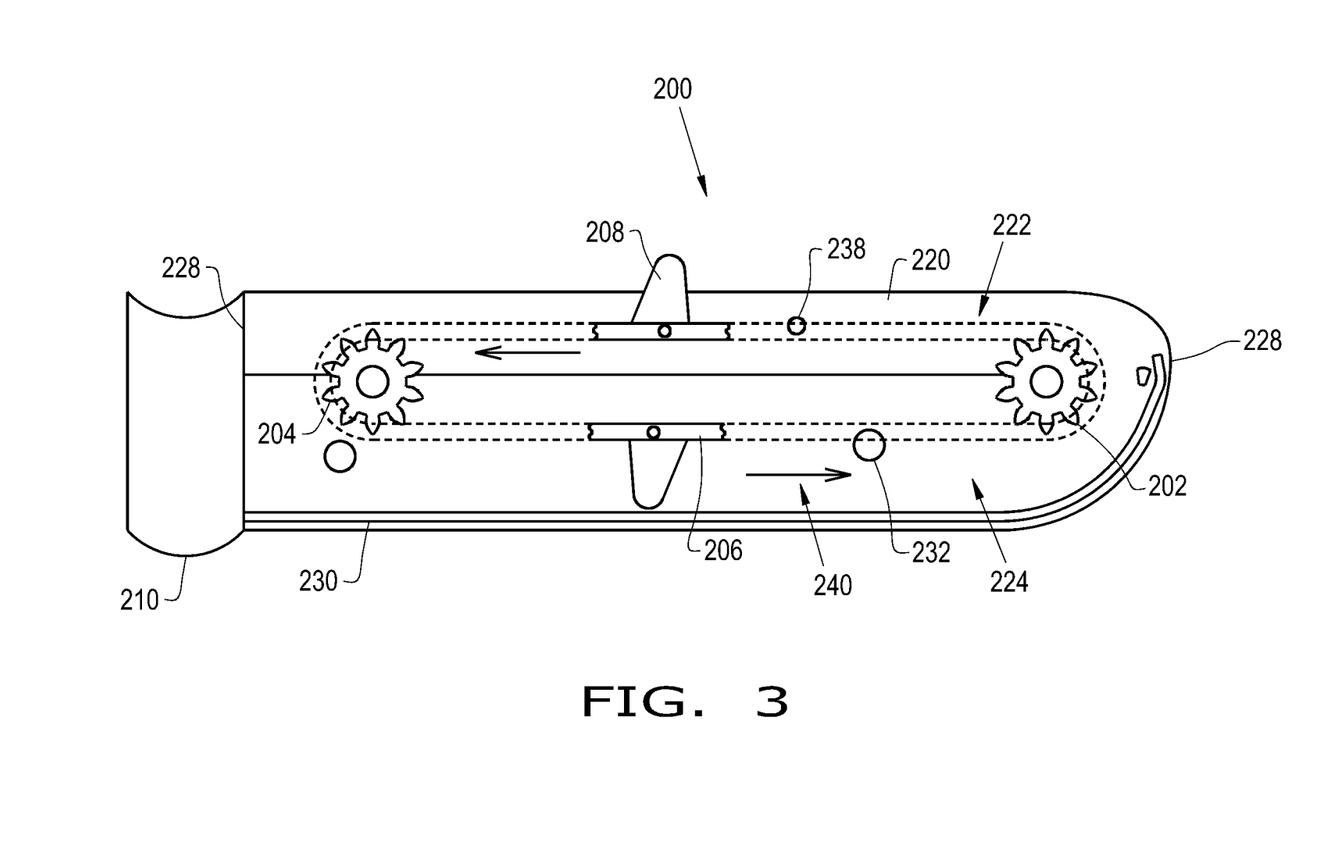
FIG. 3 is a perspective view of another embodiment of a row unit side.

Referring now to FIG. 3 there is shown a row unit side 200. It is to be understood that row unit side 200 and a symmetrical row unit side (not illustrated) together form the row unit, where the symmetrical row unit side is symmetrical to row unit 200 about the harvesting channel 116. The row unit side 200 includes an idler sprocket 202 and a drive sprocket 204. The idler sprocket 202 and drive sprocket 204 are enmeshed via a gather chain 206. The gather chain 206 includes a plurality of gather chain lugs 208. The gather chain lugs 208 are configured to collect a kernel crop, i.e. corn, and direct the kernel crop to an auger trough 210 disposed at one end of the row unit side 200*a*. The row unit side 200*a* further includes a deck plate 220 with a harvest side 222 and a return side 224. The deck plate 220 has a first end 226 and a second end 228 where the first end 226 is disposed at the end of the row unit 220 closest to the auger trough 210. A kernel channel 230 is disposed on an edge of the return side of the deck plate 220. The kernel channel 230 may be formed integral to or attached to the deck plate 220. Examples of being formed integral include but are not limited to: a stamping with a rolled edge, a forging with a raised edge, a casting with a raised edge or a machined surface with a raised edge. Methods of attachment include but are not limited to: welding, the use of fasteners or press fit. The kernel channel 230 may be formed of the same or different material of the deck plate 220. The deck plate 220 may be removably attached to the to the row unit side 200 with fasteners (not shown) through a plurality of attachment holes 232, 238 or the deck plate 220 may be permanently attached via a method such as welding. The deck plate 220 is formed by two plates, a harvest side plate 222 and a deck plate extension 240. The deck plate extension 240 may be added to the row unit side 200 as original equipment or the deck plate extension 240 may be added as an aftermarket part to an existing row unit side 200. The harvest side plate 222 includes a harvest plate first edge that may align or overlap with a deck plate extension first edge when the harvest side plate 222 and the deck plate extension 240 are installed. The deck plate extension 240 may be further provided to have a width that is wider than a width of the harvest side plate 222. The deck plate extension 240 of the present row unit side 200 may be in contact or sufficiently close to contact with a deck plate extension 240 of a symmetrical row unit side of an adjacent row unit 200 thereby providing that the gap 118 is completely covered or sufficiently covered.

Figure 4:
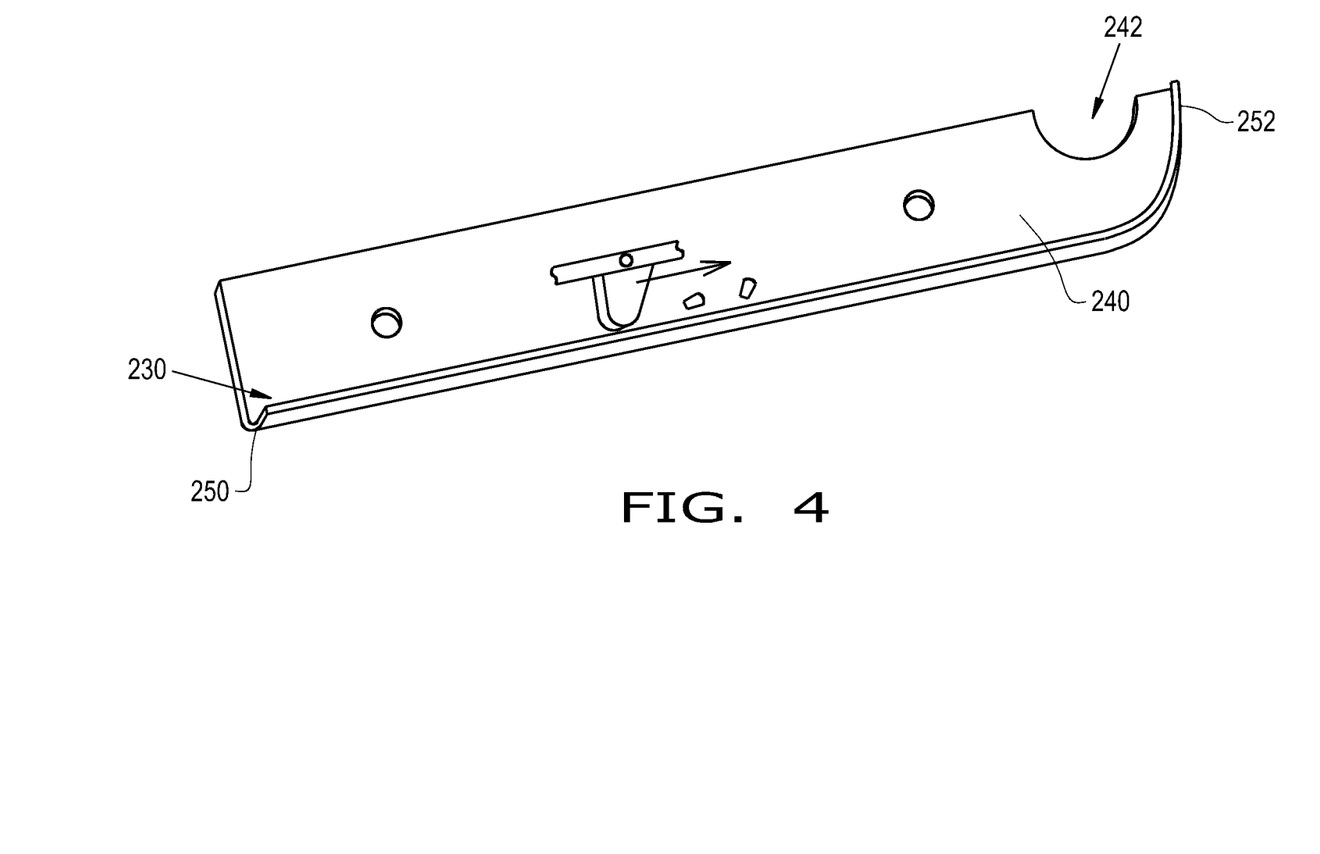
FIG. 4 is top view of a deck plate extension of the embodiment shown in FIG. 3.

Referring now to FIG. 4, there is shown a deck plate extension 240 having a kernel channel 230 formed on a deck plate extension second edge 250. The kernel channel 230 may be formed integral or may be attached to the deck plate extension second edge 250. Examples of being formed integral include but are not limited to: a stamping with a rolled edge, a forging with a raised edge, a casting with a raised edge or a machined surface with a raised edge. Methods of attachment include but are not limited to: welding, use of fasteners or press fit. The kernel channel 230 may be formed of the same or different material of the deck plate extension 240. The kernel channel 230 may be configured to extend over a portion of the harvest side plate 212.

An idler sprocket notch 242 may be formed near a deck plate extension second end 252 to provide clearance for an idler sprocket 202.

Referring now to FIG. 5, there is shown a second end 128 of the row unit side 100A with an idler sprocket 102. The idler sprocket 102 is shown with a plurality of idler sprocket propellers 144 attached to the idler sprocket 102 between a top surface of the deck plate 120 and a bottom surface (not shown) of the idler sprocket 102. The plurality of idler sprocket propellers 144 are configured to push the kernel crop from the return side to the harvest side while being guided by the kernel channel 130.

Figure 6:
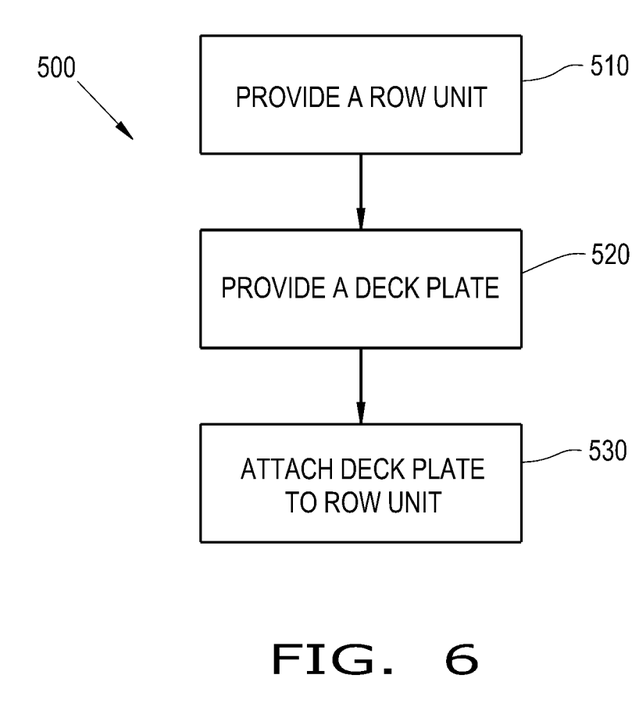
FIG. 6 is a flowchart of an embodiment of a method of the present invention for reducing kernel loss.

Shown in FIG. 6, a method 500 for reducing kernel loss from a row unit return side on an agricultural harvester. The method generally includes the steps of providing a row unit having a harvest side and a return side, the row unit including an idler sprocket, a drive sprocket, a gather chain having a plurality of gather chain lugs, and a deck plate on the harvest side (step 510). Providing a deck plate extension having a first end and a second end, the deck plate extension being configured to attach to the return side of the row unit, an idler notch being formed in the deck plate extension near the second end, a kernel channel formed on at least a portion of the deck plate extension (step 520). Attaching the deck plate extension to the return side of the row unit forming essentially no gap between the deck plate and the deck plate extension (step 530).

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A row unit side of a row unit for an agricultural harvester,
comprising,
a deck plate having a leading end and a trailing end relative to a direction of travel;
an idler sprocket rotatably attaching to the deck plate near the leading end;
a drive sprocket rotatably attaching to the deck plate near the trailing end;
a gather chain having a plurality of gather chain lugs, the gather chain enmeshed with the idler sprocket and the drive sprocket; and
a deck plate extension,
with a harvest side, a return side, a first end and a second end, the deck plate extension attaching to the deck plate, the deck plate extension including an idler notch being formed near the second end of the deck plate extension, and the deck plate extension further including a kernel channel formed on at least a portion of the return side of the deck plate extension.

2. The row unit side of claim 1, wherein the deck plate is a harvest side plate.

3. The row unit side of claim 2, wherein the harvest side plate and the deck plate extension include portions that overlap.

4. The row unit side of claim 1, wherein the deck plate extension is wider than the harvest side plate.

5. The row unit side of claim 1, wherein the idler sprocket includes a plurality of kernel propellers.

6. A deck plate extension for a row unit side of a row unit for an agricultural harvester having a deck plate edge and an idler sprocket, the deck plate extension comprising:
a plate having a first end, a second end, a first edge and a second edge, the plate having a length from the first end to the second end and a width traverse to the length, the plate being configured to attach near a deck plate edge of the row unit side, the plate including an idler notch being formed for at least partially surrounding the idler sprocket, and the plate further including a kernel channel formed on at least a portion of the second edge of the plate, the second edge of the plate being along a return side of the plate, the kernel channel configured for guiding a kernel from the plate to a deck plate of the row unit.

7. The deck plate extension of claim 6, wherein the kernel channel includes a section that overlaps the deck plate.

8. The deck plate extension of claim 6, wherein a portion of the kernel channel is configured to align with a plurality of kernel propellers on an idler sprocket.

9. The deck plate extension of claim 6, wherein the plate is rigidly attached when attached to the row unit.

10. The deck plate extension of claim 6, wherein the plate is wider than the deck plate.

11. The deck plate extension of claim 6, wherein the plate is movably attached when attached to the row unit.

12. The deck plate extension of claim 6, wherein the first edge is aligned adjacent to the deck plate edge of the row unit.

13. The deck plate extension of claim 6, wherein the first edge and the deck plate edge overlap.

14. A method for reducing kernel loss from a row unit return side on an agricultural harvester, the method comprising:
providing a row unit having a harvest side and a return side, the row unit including an idler sprocket, a drive sprocket, a gather chain having a plurality of gather chain lugs, an auger trough, and a deck plate on the harvest side;
providing a deck plate extension having a first end and a second end, the deck plate extension being configured to attach to the return side of the row unit, an idler notch being formed in the deck plate extension near the second end, a kernel channel formed on at least a portion of a return side of the deck plate extension; and
attaching the deck plate extension to the return side of the row unit forming substantially no gap between the deck plate and the deck plate extension.

15. The method of claim 14, wherein the deck plate and the deck plate extension include portions that overlap.

16. The method of claim 14, wherein the deck plate extension is wider than the deck plate.

17. The method of claim 14, wherein the idler sprocket includes a plurality of kernel propellers.

* * * * *